Patented Sept. 29, 1931

1,825,249

UNITED STATES PATENT OFFICE

WILHELM PUNGS, OF LUDWIGSHAFEN-ON-THE-RHINE, AND KARL BEHRINGER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTS RESEMBLING NATURAL WAXES

No Drawing. Application filed April 5, 1929, Serial No. 352,904, and in Germany July 5, 1928.

The present invention relates to the production of products resembling natural waxes.

In several applications for patent, for example in the applications Ser. Nos. 254,604, filed February 15, 1928 and 252,037, filed February 4, 1928, one of the present inventors has described processes for the bleaching of, and production of valuable products from, crude or deresinified Montan wax according to which Montan wax is bleached by means of a solution of an oxidizing agent and, for the purpose of increasing the binding power of the products obtained, is treated with a larger quantity of oxidizing agents than is necessary for complete bleaching, whereupon, if desired, some of the carboxyl groups of the free organic acids present in the bleached Montan wax are converted into groups containing the —CO— group but which are free from carboxyl hydrogen atoms.

We have now found that new products resembling natural waxes in their physical properties are obtained by heating the Montan wax bleached with the aid of solutions of oxidizing agents or similar bleached Montan wax, which can be obtained for example by purifying a bleached Montan wax by distillation or converted bleached Montan wax, with hydroxy-carboxylic acids of high molecular weight, thereby causing esterification to take place between the carboxyl groups of the acids contained in the bleached Montan wax and the hydroxyl groups of the hydroxy-carboxylic acids. As hydroxy-carboxylic acids we may use for example natural oily, fatty, resinous or waxy substances which contains free carboxyl groups and hydroxy groups, but these may also be replaced wholly or partially by aromatic or hydroaromatic acids such as salicylic acid and the like or mixtures thereof. Instead of free hydroxy-carboxylic acids, we may also use such derivatives thereof, in which the carboxyl group is esterified or converted into a salt. The temperatures employed will usually range between about 100° and 200° centigrade, preferably between 120° and 180° centigrade. We prefer to carry out the process with an addition of one or more of the well-known catalysts promoting esterification, such as hydrochloric acid, sulphur dioxide, sulphuric acid, sulphonic acids of organic compounds, such as benzene sulphonic acid, toluene sulphonic acid, naphthalene sulphonic acid, phosphoric acid and like acids. In case the resulting products still contain free carboxyl groups, these may be converted wholly or partially into salts or mixtures of different salts or into esters or other derivatives in which the —CO— group still remains, for example anhydrides or amides.

The properties of the products obtained in accordance with the present invention may be varied by adding solid or liquid hydrocarbons, oils, fats, waxes or resins which contain no free carboxyl groups, or mixtures of these substances, either before, during or after the esterification.

The following examples will further illustrate the nature of this invention but the invention is not restricted to these examples.

Example 1

40 kilograms of castor oil and 60 kilograms of a highly bleached Montan wax prepared for example according to the application for Letters Patent Ser. No. 252,037 are heated for five hours at 160° centigrade while gaseous hydrochloric acid is passed in.

The product obtained resembles bees-wax.

Example 2

40 kilograms of the acids obtainable by saponifying castor oil and 60 kilograms of a Montan wax bleached according to the process described in the application for Letters Patent Ser. No. 254,604 are heated for five hours at 160° centigrade while hydrochloric acid gas is introduced. 20 kilograms of polyglycol monoethyl ether are then added and the whole heated for three hours at 120° centigrade.

The product differs from that obtained according to the foregoing example by its increased softness.

What we claim is:—

1. The process of producing products resembling natural waxes which comprises heating a bleached Montan wax with a hydroxy-carboxylic acid of high molecular weight until at least partial esterification occurs.

2. The process of producing products resembling natural waxes which comprises heating an oxidation-bleached Montan wax with a hydroxy-carboxylic acid of high molecular weight to between 100° and 200° centigrade until at least partial esterification occurs.

3. The process of producing products resembling natural waxes which comprises heating an oxidation-bleached Montan wax with ricinoleic acid until at least partial esterification occurs.

4. As new articles of manufacture, products resembling natural waxes comprising esters of the free acids contained in bleached Montan wax with a hydroxy-carboxylic acid of high molecular weight.

5. As new articles of manufacture, products resembling natural waxes comprising esters of the free acids contained in oxidation-bleached Montan wax with ricinoleic acid.

In testimony whereof we have hereunto set our hands.

WILHELM PUNGS.
KARL BEHRINGER.